May 24, 1960
H. AMOS
2,937,401
METHOD OF AND APPARATUS FOR MOLDING
AND CURING PLASTIC MATERIAL
Filed April 4, 1956
2 Sheets-Sheet 1
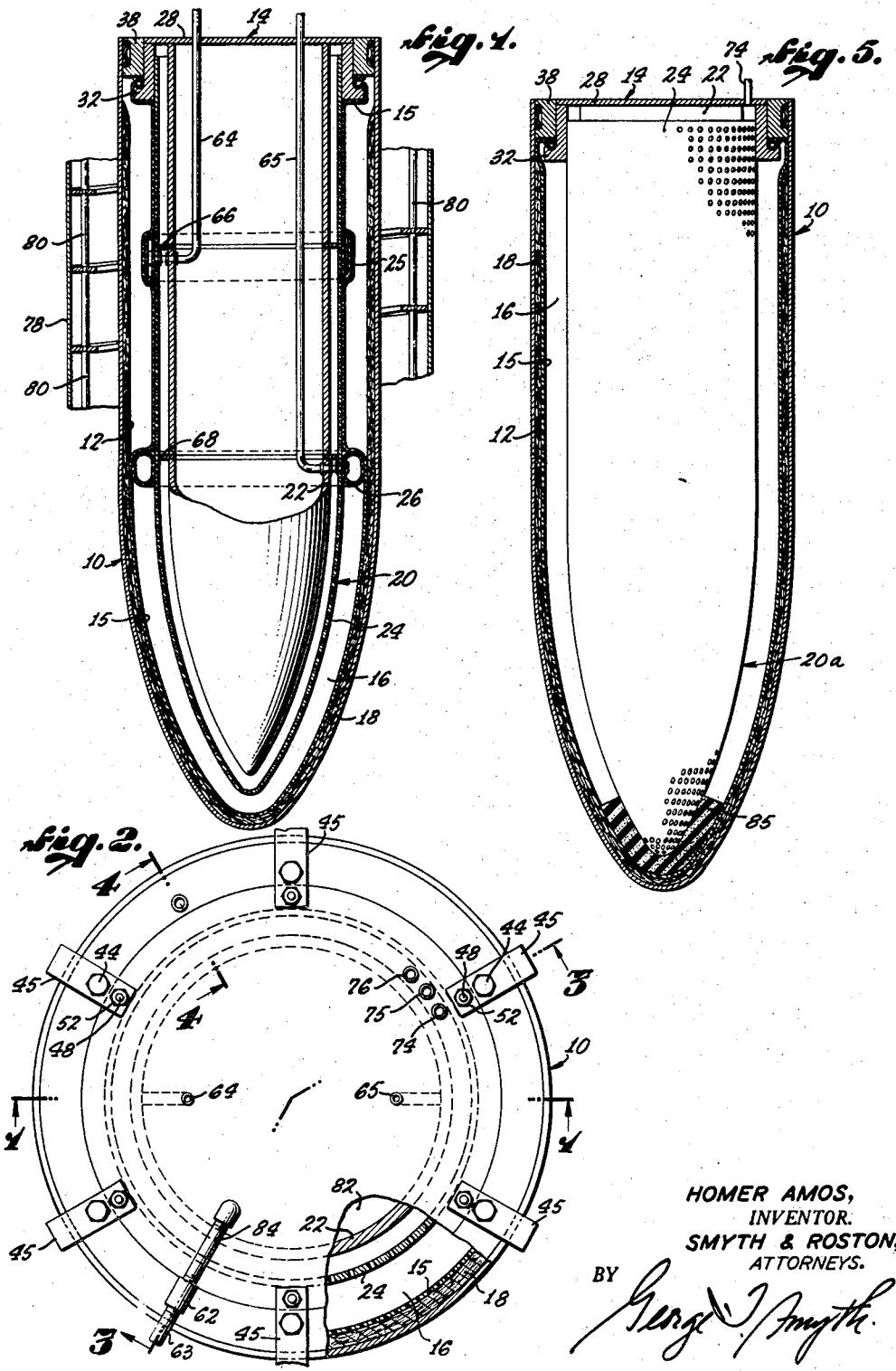
HOMER AMOS,
INVENTOR.
SMYTH & ROSTON,
ATTORNEYS.
BY

United States Patent Office 2,937,401
Patented May 24, 1960

2,937,401

METHOD OF AND APPARATUS FOR MOLDING AND CURING PLASTIC MATERIAL

Homer Amos, Burton, Wash., assignor to Pastushin Aviation Corporation, Los Angeles, Calif., a corporation Filed Apr. 4, 1956, Ser. No. 576,177

15 Claims. (Cl. 18—5)

This invention relates to a method of and apparatus for producing a molded wall member of plastic material. The process is characterized by the use of a mold to receive a layer of the plastic material and the use of a cooperating flexible sheet. Fluid pressure is applied to one side of the sheet to press the sheet against the plastic layer during a curing operation and subsequently fluid pressure is applied to the other side of the sheet to peel the sheet away from the cured plastic layer. A process of this general character is set forth in the copending Amos et al. application Ser. No. 448,064 filed August 5, 1954, now Patent No. 2,870,054, entitled Method and Apparatus for Fabricating Hollow Bodies and Sheets of Plastic Material, which disclosure is hereby made a part of the present disclosure by reference.

By way of example, the present disclosure is specifically directed to a procedure in which a hollow plastic object is formed by first depositing a layer of uncured plastic material on the inner surface of a hollow mold that is open at one end and closed at the other end. A closure assembly cooperates with the mold to seal off the open end thereof and a bag carried by the closure assembly divides the sealed interior of the mold into an inner chamber inside the bag and an outer annular space around the bag between the bag and the mold, this outer annular space containing the layer of uncured plastic. For the purpose of reducing the volume of the air space in the inner chamber, a suitable body which may be termed a mandrel is supported by the closure assembly inside the bag.

Means is provided to evacuate the inner chamber inside the bag and the outer annular space outside the bag, selectively. This arrangement permits removal of air and vapor from the uncured plastic layer by means of a vacuum pump and further permits the development of an outward pressure differential across the wall of the bag for compressing the uncured resin and the subsequent development of an inward pressure differential to peel the bag away from the cured plastic.

One of the problems to which the invention is directed arises from the fact that in the peeling action, the bag is collapsed inward against the mandrel. Since the peeling action may proceed in a random or irregular manner, the mandrel may be subjected to unbalanced fluid pressure with consequent lateral thrust against the mandrel. As will be explained, one solution to this problem afforded by the invention is provision for progressive control of the peeling action to eliminate any substantial lateral thrust against the mandrel. An alternate solution afforded by the invention is to provide special means to stabilize or reinforce the mandrel and thereby make the mandrel immune to any lateral thrust that may arise in the course of the peeling action.

Another problem to which the invention is directed is the requirement of maintaining a vacuum in the outer annular space containing the plastic for a prolonged curing period without keeping the annular space connected to a vacuum pump. In certain practices of the invention, it is desirable to disconnect the mold completely from the vacuum pump to permit the mold to be moved freely from one processing station to another. Since the volume of the annular space enclosing the uncured plastic is relatively small, even an exceedingly small leak into the evacuated space would spoil the vacuum therein over any protracted processing period. The invention meets this problem by providing what may be termed a vacuum reservoir. A sealed chamber of suitable volume is placed in communication with the annular space to serve, in effect, to increase the effective volume of the annular space. A relatively small air leak into this combined space of relatively large volume has no appreciable effect over the time span of the curing operation.

The various features and advantages of the invention will be understood from the following detailed description considered with the accompanying drawings.

In the drawings, which are to be regarded as merely illustrative:

Figure 1 is a somewhat simplified longitudinal sectional view of a mold incorporating one practice of the invention, the section being taken along the diameter indicated by the line 1—1 of Figure 2;

Figure 2 is a plan view of the upper end of the mold, with a portion of the mold closure assembly broken away;

Figure 3 is an enlarged fragmentary longitudinal sectional view similar to Figure 1 showing the construction of the upper portion of the mold, the section being taken as indicated by the angular line 3—3 of Figure 2;

Figure 4 is a fragmentary section taken along the line 4—4 of Figure 2 showing means for inflating an expansible seal around the closure assembly of the mold; and Figure 5 is a longitudinal sectional view similar to Figure 1 illustrating a second practice of the invention.

Figure 1 shows a mold 10 of circular cross-sectional configuration that is open at its upper end and closed at its lower end, the mold being tapered to conform to the configuration of an end section of an airplane fuel tank that is to be made of plastic material in the general manner taught by the above mentioned prior application. In this instance, the material used for fabricating the tank comprises a polyester resin with glass fibers embedded therein.

Figure 1 shows a layer 12 of the plastic material deposited on the inner surface of the mold 10. The resin and the glass fibers embedded therein may be applied in any manner on the inner surface of the mold to form the layer 12. For example, as taught in the prior application, the uncured resin and glass fiber flock may be projected on to the inner surface of the mold while the mold is rotating about its longitudinal axis to cause the deposited material to be held in place by centrifugal force.

What may be termed a closure assembly, generally designated by numeral 14, is removably mountable on the upper open end of the mold 10 to seal the interior of the mold. This closure assembly 14 carries a flexible bag 15, the rim of which is attached to the closure assembly in a fluid-tight manner to divide the interior of the mold into what may be termed an inner chamber 16 inside the bag and an outer annular space 18 surrounding the bag between the bag and the inner surface of the mold 10. This outer annular space 18 encloses the layer 12 of the uncured resin.

The closure assembly 14 also carries a body or mandrel 20 inside the bag 15 to reduce the volume of the air space in the inner chamber 16. In this instance, the mandrel 20 is of double-walled construction, the mandrel having an inner solid wall 22 that is connected to the closure assembly 14 in a fluid-tight manner and also having an outer perforated wall 24 for contact with the bag 15. These two walls 22 and 24 preferably conform to the configuration of the mold 10 and are substantially uniformly spaced from the inner surface of the mold as shown.

As described hereinafter, means is provided to evacuate the inner chamber 16 and the outer annular space 18 selectively to govern the behavior of the bag 15 in its relation to the resin layer 12. If the pressures in the inner chamber 16 and in the outer annular space 18 are equal, the bag 15 will neither be urged towards the resin layer 12 nor be urged away from the resin layer. Thus the bag 15 is not acted upon by fluid pressure if atmospheric pressure prevails in both the inner chamber 16 and the annular space 18 or if the inner chamber 16 and the annular space 18 are both evacuated to the same degree.

If only the outer annular space 18 is evacuated, with substantially atmospheric pressure prevailing in the inner chamber 16, the bag 15 is pressed outwardly against the resin layer 12. The resin layer is placed under pressure in this manner during the curing period. On the other hand, if the inner chamber 16 is evacuated while the annular space 18 is under substantially atmospheric pressure, the bag will be forced radially inward away from the layer 12 against the perforated wall 24 of the mandrel 20. Unless this peeling action is controlled the bag may peel away from the cured resin layer in an irregular manner. For example, if only one longitudinal half of the bag peels away from the resin layer against the mandrel 20, the other longitudinal half of the bag remaining momentarily in contact with the resin layer, the result will be a lateral thrust of relatively high magnitude against the mandrel. Such a high magnitude side thrust resulting from unbalance of the fluid pressure against the mandrel may not only damage the structure of the mandrel and the closure assembly that supports the mandrel but may also damage the bag 15. In addition, of course, the mandrel 20 may be thrust in this manner forcibly against the resin layer 12 to cause damage thereto.

One solution to this problem relating to the peeling action is illustrated by Figures 1 to 4 and includes the use of at least one inflatable tube of rubber-like material surrounding the mandrel 20 to divide the inner chamber 16 into a plurality of zones. In this instance, there are two such inflatable tubes comprising an upper tube 25 of rubber-like material and a similar lower tube 26, these tubes being similar to the inner tubes of automobile tires.

With both of the tubes 25 and 26 inflated, the chamber 16 defined by the bag 15 and the mandrel 20 is divided into three zones, comprising an upper zone, an intermediate zone and a lower zone. This arrangement permits the peeling action to be carried out in three stages. Thus, with atmospheric pressure prevailing in the outer annular zone 18 surrounding the bag 15, the upper zone of the inner chamber 16 is first evacuated to cause initial peeling of the bag away from the resin layer 12, this peeling action being stopped by the upper inflated tube 25. After a time interval sufficient to insure completion of this first stage of the peeling action, the upper tube 25 is deflated to permit a second stage of the peeling action through the intermediate zone, the second stage of peeling action being stopped by the lower inflated tube 26. Finally, after a suitable time interval, the lower tube 26 is deflated to permit the last stage of the peeling action.

An important feature of the described arrangement is that it makes possible close control of the tension to which the bag is subjected in the peeling action. This tension is determined by the spacing of the parts as well as by the magnitude and rate of application of the air pressure between the bag and the mold. Such control is of the utmost importance because the bag adheres to the cured resin tenaciously and the bag material is easily torn.

The details of construction of the closure assembly 14, the mandrel 20, and the inflatable tubes 25 and 26 that make this mode of peeling operation possible will now be described.

As best shown in Figure 3, the inner solid wall 22 of the mandrel 20 is attached to an end plate 28 of the closure assembly in a fluid-tight manner by welding 30. What may be termed an inner ring 32 of the mandrel assembly is also attached to the underside of the end plate 28 in a fluid-tight manner by welding 34 and the outer perforated wall 24 of the mandrel telescopes into this inner ring and is connected thereto by welding 35 and 36.

A second outer ring 38 cooperates with the inner ring 32 to engage the rim of the bag 15 in a fluid-tight manner. For this purpose, the rim of the bag 15 is folded back on itself and is wrapped around a ring-shaped core 40 that is tapered or triangular in cross-sectional configuration as shown. The inner ring 32 is formed with an outer upwardly facing circumferential groove 42 to seat the rim portion of the bag that is wrapped around the core 40 and the second outer ring 38 is adapted to press the rim portion of the bag and the enclosed core downward into this groove with sufficient force to engage the rim of the bag in a fluid-tight manner.

In the construction shown, the outer ring 38 is attached by cap screws 44 to a series of short radial bars 45 of the closure assembly, each of the bars overlapping the end plate 28 of the closure assembly and extending radially outward to rest against the top edge of the mold 10. As shown in Figure 3, each of the radial bars 45 has a bore 46 to receive a threaded stud or screw 48 in a sliding manner, which stud is threaded into a tapped bore 50 that extends into the inner ring 32. The screw 48 carries a pair of nuts 52 and 54. It is apparent that the nuts 54 may be tightened against the radial bars 55 to force the outer ring 38 downward towards the circumferential groove 42 and that the nuts 52 may be tightened against the nuts 54 to prevent loosening thereof.

To complete the sealing of the interior of the mold 10, an expansible sealing element in the form of a circumferential diaphragm 55 is mounted in a relatively wide outer circumferential groove 56 of the outer ring 38. In the construction shown, the upper and lower margins of the circumferential diaphragm 55 are anchored in the groove 56 in a fluid-tight manner by corresponding wire rings 58.

Any suitable means may be provided to inflate the circumferential diaphragm 55 into sealing contact with the inner surface of the surrounding mold 10. For example, as shown in Figure 4, the outer ring 38 may be bored to provide an angular passage 59 leading to the groove 56 inside the circumferential diaphragm 55. A tubing member 60 is welded into the outer end of this passage and is connected by suitable valve means (not shown) to a suitable source of pressurized fluid for inflation of the circumferential diaphragm 55 when desired. Once the diaphragm 55 is inflated, the tubing member may be disconnected from the source. Any suitable arrangement may be provided for evacuating the outer annular space 18 around the bag 15 when desired. Thus as best shown in Figure 3, an angular passage 61 may be bored in the outer ring 38 and may be connected to a suitable vacuum pump (not shown). For this purpose, a T fitting 62 connected to the outer end of the angular passage 61 is connected to a tubing member 63, the tubing member 63 communicating with a vacuum pump.

As best shown in Figure 1, inflation and deflation control of the upper inflatable tube 25 is controlled from the outside by a tubing member 64 that extends through the end plate 28 of the mandrel assembly and extends through both walls 22 and 24 of the mandrel 20 for connection to the upper tube. The juncture of the tubing member 64 with the end plate 28 is sealed and again the juncture with the solid wall 22 of the mandrel is sealed. In like manner, a second tubing member 65 extends through the end plate 28 and the two walls 22 and 24 of the mandrel to communicate with the lower inflatable tube 26. These two tubing members 64 and 65 provide means for connecting the two inflatable tubes 25 and 26 independently to a suitable source of compressed gaseous fluid such as a source of compressed air for inflation of the tubes and also provide means by which the two tubes may be deflated selectively.

In this particular embodiment of the invention, it is further contemplated that a metal ring 66 will interconnect the two walls 22 and 24 in a fluid-tight manner in the region of the upper inflatable tube 25 to cooperate therewith for dividing the inner chamber 26 into zones and that a second metal ring 68 will interconnect the two walls 22 and 24 in the region of the lower inflatable tube 26 to cooperate therewith for the same purpose. To make it possible to fabricate this construction of the mandrel, the inner solid wall 22 of the mandrel may be made in sections which are welded together. Thus Figure 3 shows the upper metal ring 66 interposed between two wall sections 22a and 22b, the metal ring being welded to the two sections as indicated at 70 and also being welded to the outer perforated wall 24 as indicated at 72.

As best shown in Figure 3, a tubing member 74 may be provided for evacuating the first zone above the inflatable tube 25, a second tubing member 75 may be provided for evacuating the second zone between the two inflatable tubes 25 and 26, and a third tubing member 76 may be provided for evacuating the third zone below the inflatable tube 26. The tubing member 74 extends through the end plate 28 of the closure assembly to terminate in the upper zone; the tubing member 75 additionally extends through the metal ring 66 to terminate in the intermediate zone, and, finally, the third tubing member 76 extends through both metal rings 66 and 68 to terminate in the third and lower zone.

The manner in which the described structure serves its purpose of controlling the peeling action of the bag 15 may be readily understood from the foregoing description. After the layer 12 of uncured resin is deposited in the mold 10 and the closure assembly 14 has been installed, compressed air is admitted through the tubing member 60 to seal the open end of the mold 10. Then the tubing members 63, 74, 75 and 76 are all connected to a vacuum pump or the like to evacuate both the outer annular space 18 surrounding the bag 15 and the inner chamber 16 inside the bag. This section results in withdrawal of moisture and air from the layer 12 of uncured resin and since evacuating occurs on both sides of the wall of the bag 15, the bag does not press against the layer 12 to interfere with such withdrawal.

Preferably, a very slight pressure differential is created inwardly across the wall of the bag by evacuating the inner chamber 16 inside the bag to a slightly greater degree than the outer annular space 18 to cause the bag to retract completely away from the layer 12 against the mandrel 20. For example, the outer annular space 18 that encloses the layer 12 may be evacuated to a pressure of 8 millimeters of mercury and the inner chamber 16 may be evacuated to a pressure of 4 millimeters of mercury, the inward pressure differential of 4 millimeters of mercury causing the bag to tend to collapse against the mandrel away from the layer 12. After a short time interval, air is admitted to the inner chamber 16 to cause a pressure differential in the opposite direction to force the bag outward against the layer 12. After a further short time interval the inner chamber 16 is again evacuated to a pressure of about 4 millimeters.

Unexpectedly, it has been found that changing the pressure differential across the bag 15 in this manner while the outer annular space 18 is evacuated results in substantially complete removal of air and moisture from the layer 12 of uncured resin, whereas such effective removal is not accomplished if the pressure differential across the bag is not reversed in this manner. In this regard, it is to be noted that the volatile constituent in the resin is highly volatile and readily condenses in an evacuated space whereas any air that may be trapped is noncondensible. When the described admission of atmosphere to the inner chamber 16 causes the bag to press outward against the evacuated layer 12, residual air along the surface of the layer is displaced in the general direction of the exhaust port of the outer annular space 18. The subsequent movement of the wall of the bag away from the layer 12 again restores the freedom for residual air to escape from the layer 12 to the exhaust port of the annular space 18.

The next step is to place the layer 12 of uncured resin under pressure by creating an outward pressure differential across the wall of the bag 15 and to cure the resin layer 12 by the application of heat with the pressure sustained throughout the curing interval. The cure may be accomplished, for example, by inserting the mold inside a cylindrical shroud 78 equipped with resistance elements 80 for heating the mold 10 by radiant heat. The required pressure on the part of the bag 15 against the resin layer 12 is accomplished by maintaining a vacuum in the outer annular space 18 and admitting atmosphere into the three tubing elements 74, 75 and 76 simultaneously to place the inner chamber 16 under atmospheric pressure.

The next step after the curing operation is the step of peeling the bag 15 away from the cured resin layer 12. For this purpose, the two inflatable tubes 25 and 26 are inflated by admitting compressed air through the tubing members 64 and 65 and the tubing 63 is placed in communication with the atmosphere to destroy the vacuum in the outer annular space 18. Air is then evacuated through the tubing member 74 for evacuation of the upper zone of the inner chamber 16. Since the inflated tube 25 and the metal ring 66 seal off this zone, the remaining zones are not affected by the evacuation. In some practices of the invention, partitions 66 and 68, as well as tubes 75 and 76, may be omitted but in such instances the tube 25 is inflated to a pressure well above the pressure in annular space 18.

As a result of the evacuation of the upper zone while atmospheric pressure is maintained in the outer annular space 18, the bag 15 is subjected to a radially inward pressure differential that peels the bag away from its adhering contact with the cured resin layer 12. This initial peeling action promptly extends to the upper inflated tube 25 but is prevented by the inflated tube from progressing downward any further. The next step is to deflate the upper rubber tube 25 and to evacuate air from the second zone by means of the tubing 75. Evacuation may be continued during this period by means of the tubing 74. The peeling action then progresses through the intermediate zone to the inflated lower rubber tube 26. Finally, the lower rubber tube 26 is deflated and air is evacuated from the third zone by means of the tubing 76 to complete the final peeling action. During this final step, evacuation may also be continued through the tubing 74 and 75.

As shown in Figure 3, the tubing 63 may be provided with a valve 65, which valve may be closed to maintain vacuum in the outer annular space 18. The valve 65 may then be disconnected from the vacuum pump to permit the mold 10 with the closure assembly 14 thereon to be moved bodily to a new processing zone. Disconnecting the annular space 18 from the vacuum pump in this manner makes it possible for even minute leakage of air past the circumferential diaphragm 15 to raise the pressure in the annular space 18. This effect of minute leakage is avoided by connecting the annular space 18 with what may be termed a vacuum reservoir. In the construction shown, the vacuum reservoir comprises a sealed chamber 82 in the mandrel 20 defined by the inner solid wall 22 and the end plate 28. This chamber or vacuum reservoir 82 is connected by tubing 84 and the previously mentioned T 62 with the annular space 18 and thus, in effect, increases the effective volume of the annular space 18 with respect to the maintenance of the vacuum therein. With this greatly increased volume to receive any air that may leak in past the circumferential diaphragm 55, minor leakage past the diaphragm will have only negligible effect on the pressure differential across the wall of the bag 15.

Figure 5 illustrates a second practice of the invention which prevents damage arising from excessive unbalance of pressure against the mandrel laterally thereof in the course of the peeling action. The construction shown in Figure 5 is largely identical to the construction of the first described form of the invention as indicated by the use of corresponding numerals to indicate corresponding parts. In this instance, the inflatable tubes 25 and 26 are omitted and the previously described metal rings 66 and 68 are also unnecessary.

Preferably, a further difference is that the closure assembly 14 is freely slidable inside the mold. Thus when the interior of the mold is evacuated, the consequent pressure difference against the top of the closure assembly 14 will tend to drive the mandrel 20a downward into the lower tapered bottom end of the mold 10.

A suitable spacer member 85 conforming to the configuration of the mold 10 and the configuration of this mandrel 20a is positioned in the bottom end of the mold to seat the lower end of the mandrel. The member 85 may be, for example, a relatively thick piece of rubberlike material of conical configuration to nest the lower end of the mandrel 20a.

The tendency of the mandrel 20a to move downward in response to the pressure differential at the upper end of the closure assembly insures that the mandrel will seat snugly in the spacer member 85. Thus with the mandrel 20a positively centered at its upper end by the closure assembly 14 and positively centered at its lower end by the spacer member 85, the mandrel is stabilized against any lateral thrust that may be applied thereto incidental to irregular collapse of the bag 15 away from the resin layer 12 against the mandrel.

My description in specific detail of selected practices of the invention will suggest various changes, substitutions and other departures from my invention that properly lie within the spirit and scope of the appended claims.

I claim:

1. In an apparatus for forming plastic material, the combination of: a mold for the deposit of a layer of uncured plastic material on a surface thereof; a flexible sheet extending adjacent said surface for contact with said deposit; means cooperative with said sheet and said mold to form a first sealed space on one side of the sheet to enclose the layer of uncured plastic on said surface; means cooperative with said sheet to form a second sealed space on the other side of the sheet; means to evacuate said two sealed spaces selectively whereby both of said spaces may be evacuated to remove gas and vapor from said layer without the sheet being pressed against the layer, or only said first space may be evacuated to cause said sheet to place the layer under pressure for a curing operation, or only said second space may be evacuated to peel the sheet from the layer; and a sealed chamber in communication with said first sealed space to be evacuated therewith thereby to retard any rise in pressure in said first space that may be caused by leakage of air thereinto whereby subatmospheric pressure may be prolonged in said first sealed space without continued active evacuation thereof.

2. In an apparatus for forming plastic material, the combination of: a mold for the deposit of a layer of uncured plastic material on a surface thereof; a flexible sheet extending adjacent said mold for contact with said deposit; means cooperative with said sheet and said mold to form a first sealed space on one side of the sheet to enclose the layer of uncured plastic on said surface; means cooperative with said sheet to form a second sealed space on the other side of the sheet; means to evacuate said two sealed spaces selectively whereby the first space may be evacuated to create a pressure differential across said sheet to cause the sheet to press against said layer of plastic material during a curing operation and whereby said second space may be evacuated to cause a pressure differential across said sheet to peel the sheet away from the cured plastic layer; and at least one hollow flexible means extending completely across said second space to divide the second space into zones, said means being expansible by internal fluid pressure against said sheet to press the sheet against the layer of plastic to seal off the zones on opposite sides of the expansible means, thereby to limit the peeling action to one of said zones, and being contractable by reduction of internal fluid pressure to establish fluid communication between zones to permit the peeling action to extend across the other zone.

3. In an apparatus for forming a hollow body of plastic material, the combination of: a hollow mold for the deposit of an uncured layer of said material on the inner surface thereof; means including a flexible sheet positioned inside said mold adjacent said surface and dividing the interior of the mold into an inner sealed chamber and an outer sealed annular space, said outer space enclosing said layer of plastic material; a body supported inside said chamber to reduce the volume of air space therein; means to evacuate said inner chamber and said outer annular space selectively whereby both said inner chamber and said outer space may be evacuated to remove gas and vapor from said layer without the sheet being pressed against the layer, or only said outer space may be evacuated to cause said sheet to place the layer under pressure for a curing operation, or only said inner chamber may be evacuated to peel the sheet from the layer; and a second chamber in said body in communication with said outer annular space to reduce any rise in pressure therein that may be caused by leakage of air into the outer annular space whereby subtmospheric pressure may be prolonged in said outer annular space without continued active evacuation thereof.

4. In an apparatus for forming a hollow body of plastic material, the combination of: a hollow mold for the deposit of an uncured layer of said material on the inner surface thereof; means including a flexible sheet positioned inside said mold and dividing the interior of the mold into an inner sealed chamber and an outer sealed annular space to enclose said layer of plastic material; a body inside said chamber to reduce the volume of air space therein; means to evacuate said inner chamber and said outer annular space selectively whereby the outer annular space may be evacuated to cause said sheet to press against said plastic layer and whereby said inner chamber may be evacuated to cause the sheet to peel away from said layer into contact with said body; and at least one hollow flexible means interposed between said sheet and said body and encircling said body to divide said inner chamber into a plurality of separate zones, said dividing means being expansible by internal fluid pressure to press said sheet against said layer to isolate the two zones on opposite sides of the expansible means from each other in a fluid-tight manner thereby to confine the peeling action to one of said zones, said dividing means being contractable by reduction of internal pressure to establish fluid communication between zones thereby to permit the peeling action to extend through the other of the two zones.

5. In an apparatus for forming a hollow body of plastic material, the combination of: a hollow mold for the deposit of a layer of said material on the inner surface thereof, said mold being open at one end and closed at the other; closure means cooperative with said mold to close the open end of the mold in a fluid tight manner; a flexible bag connected to said closure means in a fluid tight manner to divide the interior of the mold into an inner chamber inside the bag and an outer annular space around the outside of the bag to enclose said layer; a body supported by said closure means inside said bag to reduce the volume of air space in said inner chamber; means to evacuate said inner chamber and said outer annular space selectively whereby said annular space may be evacuated for removing air and vapor from said layer and for causing said bag to exert pressure against the layer during a curing period, and whereby said inner chamber may be evacuated to cause the bag to peel away from the layer after the curing period; at least one inflatable means extending around said body between the body and said bag to press against said body and to press said bag locally outward against said layer thereby to divide said inner chamber into a plurality of zones sealed off from each other whereby air may be evacuated from one of said zones with said inflatable means inflated to cause the bag to peel away from said layer with the peeling action limited to said one zone and then the inflatable means may be deflated to permit the peeling action to progress through the next zone and a sealed space inside said body in communication with said outer annular space for evacuation therewith whereby subatmospheric pressure may be prolonged in said outer annular space without continued evacuation thereof.

6. In an apparatus for forming a hollow body of plastic material, the combination of: a hollow mold for the deposit of a layer of said material on the inner surface thereof, said mold being open at one end and closed at the other; closure means cooperative with said mold to close the open end of the mold in a fluid tight manner; a flexible bag connected to said closure means in a fluid tight manner to divide the interior of the mold into an inner chamber inside the bag and an outer annular space around the outside of the bag to enclose said layer; a body supported by said closure means inside said bag to reduce the volume of air space in said inner chamber; means to evacuate said inner chamber and said outer annular space selectively whereby said annular space may be evacuated for removing air and vapor from said layer and for causing said bag to exert pressure against the layer during a curing period, and whereby said inner chamber may be evacuated to cause the bag to peel away from the layer after the curing period; and at least one inflatable means extending around said body between the body and said bag to press against said body and to press said bag locally outward against said layer thereby to divide said inner chamber into a plurality of separate zones sealed off from each other whereby air may be evacuated from one of said zones with said inflatable means inflated to cause the bag to peel away from said layer with the peeling action limited to said one zone and then the inflatable means may be deflated to establish fluid communication between zones to permit the peeling action to progress through the next zone.

7. In an apparatus for forming a hollow body of plastic material, the combination of: a hollow mold for the deposit of a layer of said material on the inner surface thereof, said mold being open at one end and closed at the other end; closure means cooperative with said mold to close the open end thereof; inflatable sealing means surrounding said closure means for expansion by inflation against the inner surface of said mold to seal off the interior of the mold from the atmosphere; a flexible bag connected to said closure means to divide the interior of said mold into an inner chamber and an outer annular space; a body supported by said closure means inside said bag to reduce the air space in said inner chamber; and means to evacuate said inner chamber and said annular space selectively, said body being hollow and the interior of said body being in communication with said annular space to serve as a vacuum chamber to retard the drop in pressure in the annular space in the event air leaks past said sealing means while said annular space is evacuated.

8. In an apparatus for forming a hollow body of plastic material, the combination of: a hollow mold for the deposit of a layer of said material on the inner surface thereof, said mold being open at one end and closed at the other; closure means cooperative with said mold to seal off the interior thereof from the atmosphere; a flexible bag connected to said closure means in a fluid-tight manner to divide the interior of the mold into an inner chamber and an outer annular space to enclose said layer; a body supported by said closure means inside said bag to reduce the air space in said inner chamber, said body having an inner fluid-tight wall and an outer perforated wall for contact with said bag; means to evacuate said inner chamber and said outer annular space selectively to force said bag against said layer and to peel the bag away from the layer; and means to divide said inner chamber into a plurality of zones sealed off from each other, said dividing means comprising at least one solid ring and a corresponding annular inflatable member, said solid ring spanning the annular space inside said perforated wall in a sealed manner and said inflatable means being positioned around said perforated wall between the perforated wall and said bag for inflation to press the bag against said layer whereby said inflatable means may be inflated to confine the peeling action of the bag to one of said zones and may be deflated to permit the peeling action to continue through the next zone.

9. In an apparatus for forming a hollow body of plastic material, the combination of: a hollow mold for the deposit of a layer of said material on the inner surface thereof, said mold being open at one end and being closed and tapered at the other end; closure means cooperative with said mold to close the open end thereof in a fluid-tight manner; a flexible bag inside said mold connected to said closure means in a fluid-tight manner to divide the interior of the mold into an inner chamber and an outer annular space to enclose said layer, said bag having a tapered end extending to the tapered end of the mold; a body supported by said closure means in said inner chamber to reduce the volume of the air space therein, said body extending into the region of the tapered end of the mold; means to evacuate said inner chamber and said annular space selectively; and means nested into the tapered end of said bag in engagement with the tapered end of said body to hold the tapered end of the body in a central position relative to the surrounding mold.

10. A combination as set forth in claim 9 in which said nesting means comprises a hollow tapered body of rubber-like material.

11. A combination as set forth in claim 9 in which said closure means is slidably mounted in said mold to thrust said body towards said tapered end of the mold in response to air pressure on the outer surface of the closure means when said annular space is evacuated.

12. In a method of forming plastic material that includes the steps of depositing a layer of uncured plastic on the surface of a mold, placing a flexible sheet adjacent the surface of the layer, evacuating the space between the sheet and the mold to cause the sheet to exert pressure on the layer, applying heat to cure the layer while it is under pressure by the sheet; and subsequently creating a fluid pressure differential across the thickness of the sheet away from the layer to peel the sheet away from the cured layer, the improvement which consists of: applying said pressure differential to successive zones of the sheet for controlled progression of the peeling action by stages across the sheet.

13. In a method of forming plastic material that includes the steps of depositing a layer of uncured plastic on the surface of a mold, placing a flexible sheet adjacent the surface of the layer, evacuating the space between the sheet and the mold to cause the sheet to exert pressure on the layer, applying heat to cure the layer while it is under pressure by the sheet, and subsequently creating a fluid pressure differential across the thickness of the sheet in the direction away from the layer to peel the sheet away from the cured layer, the improvement which consists of: pressing at least one portion of the sheet against the cured layer to divide said space into at least two zones cut off from each other; and admitting a gaseous fluid into said zones successively to establish pressure in the zones successively across the thickness of the sheet in the direction away from the layer for controlled progression of the peeling action by stages.

14. In a method of forming a hollow body of plastic material that includes the steps of depositing a layer of uncured plastic on the inner surface of a hollow mold, inserting a bag into the mold adjacent the surface of the layer, placing a mandrel inside the bag to reduce the air space therein, evacuating the space between the bag and the mold to create an outward fluid pressure differential across the wall of the bag to cause the bag to press against the layer, curing the layer while the layer is under pressure from the bag, admitting air into the space around the bag after the cure, and evacuating the interior of the bag to cause the bag to peel away from the cured plastic layer and to collapse against said mandrel, the improvement which consists of: dividing the space between the bag and the mold into at least two zones sealed off from each other prior to the peeling step; and admitting air into said zones in timed sequence to cause the peeling action to progress zone by zone.

15. A method as set forth in claim 14 which is characterized by the use of at least one inflatable tube encircling said mandrel inside the bag for outward inflation against the bag to divide the space around the bag into the zones for the progressive peeling action.

References Cited in the file of this patent

UNITED STATES PATENTS

| | | |
|---|---|---|
| 1,637,532 | Oliver et al. | Aug. 2, 1927 |
| 2,363,107 | Young | Nov. 21, 1944 |

FOREIGN PATENTS

| | | |
|---|---|---|
| 313,307 | Great Britain | June 20, 1929 |